United States Patent

[11] 3,619,429

[72] Inventors: Yasuo Torigai, Funabashi-shi; Keizo Ishizaki, Tokyo, both of Japan
[21] Appl. No.: 830,332
[22] Filed: June 4, 1969
Division of Ser. No. 552,655, Mar. 29, 1966, abandoned.
[45] Patented: Nov. 9, 1971
[73] Assignee: Yawata Welding Electrode Co., Ltd. Tokyo, Japan
Continuation-in-part of application Ser. No. 656,969, May 22, 1967, now Patent No. 3,456,295. Continuation of application Ser. No. 337,644, Jan. 15, 1964, now abandoned.

[54] METHOD FOR THE UNIFORM EXTRUSION COATING OF WELDING FLUX COMPOSITIONS
8 Claims, 4 Drawing Figs.

[52] U.S. Cl. ................................................ 264/23, 264/174, 18/13, 117/202
[51] Int. Cl. ........................................ B06b 3/00, B294 3/10
[50] Field of Search ............................... 264/174, 23, 176 F, 169; 18/13; 117/202–207, DIG. 8

[56] References Cited

UNITED STATES PATENTS

| 2,009,240 | 7/1935 | Roberts et al. | 219/8 |
| 2,408,627 | 10/1946 | Green | 264/69 |
| 2,738,173 | 3/1956 | Massa | 259/2 |
| 2,802,237 | 8/1957 | Davis | 264/169 |
| 2,843,876 | 7/1958 | Rubli | 18/13 M |
| 3,042,481 | 7/1962 | Coggeshall | 264/176 F |
| 3,071,809 | 1/1963 | Lerch | 18/13 |
| 3,456,295 | 7/1969 | Torigai et al. | 18/13 D |
| 3,461,942 | 8/1969 | Hoffman et al. | 264/23 |

FOREIGN PATENTS

| 135,344 | 11/1949 | Australia | 264/23 |
| 749,779 | 5/1956 | Great Britain | 264/23 |
| 891,295 | 3/1962 | Great Britain | 117/DIG. 8 |

Primary Examiner—Jay H. Woo
Attorney—Janes & Chapman

ABSTRACT: A method and apparatus are provided for the uniform extrusion coating of flux mixtures on welding rod or wire, in which a sonic or ultrasonic wave vibration at a frequency from about 5,000 to about 400,000 c.p.s. is applied to the flux mixture to maintain its uniformity, and thereby prevent the obstruction to the smooth extrusion coating of the welding flux mixture as the flux mixture is fed under pressure to the extrusion nozzle.

METHOD FOR THE UNIFORM EXTRUSION COATING OF WELDING FLUX COMPOSITIONS

This application is a continuation-in-part and a division of copending U.S. Pat. application Ser. No. 656,969, filed May 22, 1967, now U.S. Pat. No. 3,456,295 issued July 22, 1969, which is a division of U.S. application Ser. No. 552,655, filed Mar. 29, 1966, and now abandoned, which is a continuation of Ser. No. 337,644, filed Jan. 15, 1964, and now abandoned.

It has heretofore been conventional in the manufacture of flux-coated arc welding electrodes or flux-coated wire to provide a rod or wire cut to a desired length, and pass this rod or wire through a coating machine via guide members. The coating is accomplished by extruding a mass of flux mixture under pressure onto the rod or wire by means of a nozzle, which coats the rod or wire with flux composition to a predetermined outside diameter. An extrusion apparatus of this type is shown in U.S. Pat. No. 2,198,085 to LeTourneau et al. The operation of such conventional devices has, however, encountered difficulty, due to the fact that the flux mixture is not a viscous fluid which can be readily extruded and coated uniformly upon the weld rod. Therefore, the quality of the product and the production rate of the apparatus are often very poor. Since the problems associated with extrusion coating are affected by complicated factors, it has been very difficult, though not impossible, to improve the quality and production rate of the operation. Attempts have been made to vary the composition of the flux mixture used. It has also been proposed, as mechanical countermeasures, to raise the extrusion pressures which are applied to the flux mixture, to align the direction of extrusion with the axis of the rod or wire, and to improve the configuration of the extrusion nozzle, so that the flux passing therethrough may have lower frictional resistance, etc. These attempts, however, could not attain satisfactory results.

The welding flux used for arc welding electrodes is formed by thoroughly mixing components of the flux, such as silica sand, lime, ilmenite, iron oxide, titanium, ferromanganese, or the like or organic substances in finely divided form, in particles of the order of 100 mesh. These components are combined by kneading with a binder or an aqueous solution of sodium silicate or potassium silicate, the mixture thereof or the like, in order to obtain a relatively fluid mixture. The flux mixture, therefore, is similar to a mixture of water and sand, except when organic substances are used in large amounts.

Rheological studies made on mixtures of this type have shown that under the influence of external force, as during extrusion, such mixtures have a tendency to exhibit what has been called dilatancy. Dilatancy is a phenomenon whereby a uniform mixture of relatively large size particles and a liquid tends to expand in volume, due to the expansion or dilation of the particles, when abruptly subjected to a strong external pressure. The interstices between the particles increase in size and become capillaries, which absorb the liquid from the outer portions. The surface of the compressed mixture becomes dry, and its mobility is decreased by an increase in friction between the dry particles. As dilatancy increases, the fluidity of the mixture further decreases, and solidification eventually takes place.

In order to provide for the movement of the flux mixture, and to effectively extrude the flux mixture in a continuous and uniform coating on weld wire or rod, the extrusion pressure must be capable of shearing the bonds created by the attractive forces between the particles, and overcoming the friction between adjacent particles. When a flux mixture of closely packed particles is subjected to pressure within an extrusion cylinder, the mixture is compressed, and contracts slightly during the initial stage of shearing, but dilation gradually occurs as the operation progresses. As the volume of the mixture expands, due to dilatancy, the liquid binder present in the circumferential portion of the cylinder is drawn into the central portion of the cylinder by the capillary action of the interstices between the particles. The central portion of the flux mixture becomes saturated, and is squeezed out in a thickened state through the nozzle, under the influence of the extrusion pressure. This portion of the mixture contains too high a proportion of liquid, and does not effectively nor uniformly coat the weld wire or rod. On the other hand, the shortage of liquid at the wall of the cylinder and at the extrusion nozzle decreases the fluidity of the mixture in that area and eventually results in its partial solidification and adherence to the wall. As a result of the dilatancy phenomenon and the squeezing out of the liquid-rich central portion, the required extrusion pressure increases, and the extrusion operation eventually becomes impossible. Even if the above conditions do not appear, the viscosity of the flux mixture will usually increase during coating, and the welding electrode obtained will show eccentricity, or the flux coating when dry will be extremely brittle. These are the main factors which cause low productivity, and poor quality.

In accordance with the instant invention, the dilatancy phenomenon, the squeezing out of the liquid-rich portion of the flux mixture, and eccentricity of the flux coating upon the welding electrode are substantially eliminated by applying sonic and/or ultrasonic vibration to the particles of the flux, during extrusion, in proximity to the nozzle, while applying extrusion pressures. In particular, sonic and/or ultrasonic wave vibrations are provided, within the range of approximately 5,000 to 400,000 c.p.s., to impart sufficient agitation to allow a continuous and uniform coating of the flux mixture under extrusion pressure. It has been found that such vibration imparts turbulent energy to the flux particles, which prevents dilatancy and the eventual squeeze out of a saturated portion of the flux mixture by maintaining a uniform dispersion of particles within the mixture. The uniformity of the mixture also reduces the internal friction between the particles, thus lowering the shear resistance of the mixture and obviating increases in extrusion pressure.

The utilization of vibration in a general way to improve flow conditions in extrusion and other pressure-flow devices is not new. However, such vibration techniques have not been applied to the extrusion of mixtures tending to undergo dilatancy, such as flux mixtures for the coating welding electrodes, nor can vibrations imparted by these devices effectively prevent dilatancy and squeezing out unless they are directed to the flux mixtures in accordance with the process of the instant invention.

Massa, in U.S. Pat. No. 2,738,173, discloses a device for the reduction of friction between a fluid and the walls of a conduit through which it is passing, by applying high-frequency vibrations to the walls of the conduit. The vibrational waves break down a fluid film of variable thickness that tends to build up in the passage, reduce the cross-sectional area and thereby restrict the flow. The Massa device is directed toward improving the flow of viscous liquids, such as paint, by preventing clogging of relatively small orifices, such as spray nozzles, rather than the extrusion of mixtures containing solid particles suspended within a liquid binder. The drive pressure necessary to spray a viscous liquid through the nozzle is much lower than that required to extrude a mixture of suspended solid particles. Furthermore, the suspended particles in a welding flux mixture are relatively large in size, a factor which leads to particle jams and by itself could prevent extrusion through a small nozzle. Simply vibrating the flow nozzle beyond the point of cross-sectional area reduction, as shown by Massa, or at any other point, would not prevent the flux particles from being retained within the nozzle. Assuming that the nozzle is sufficiently large to permit extrusion of welding flux, the vibration means shown by Massa would also not prevent dilatancy. To effectively impart turbulent energy to the particles of welding flux mixture to prevent dilatancy, the vibration must be applied to the mixture over a relatively large area, prior to the reduction in cross-sectional flow area within the extrusion nozzle, since the initial stages of dilatancy and squeeze out can and do occur before the flux mixture is severely compressed. Vibrating the nozzle after the flux mixture is fully compressed as in the Massa device would not correct the situation, where the mixture is already dilated and partially solidified.

A method and apparatus for extruding plastic insulation covering for wiring are disclosed by Lerch in U.S. Pat. No. 3,071,809. It had been found that extreme shear stress created during the extrusion of molten plastic material causes tears or fractures in the extruded plastic at the entrance of the extrusion die. Lerch prevents critical shear stress from being reached by varying the annular flow area for the plastic directly upstream of the extrusion die, at a frequency of approximately 10,000 c.p.s. This is accomplished by the high-frequency reciprocation of a core tube having a conical end, within the matching conical entrance to the extrusion die. The high-frequency variation in the annular area maintains uniformity of the plastic coating material, and prevents its fracture upon extrusion. The use of this method and apparatus for the extrusion coating of weld wire or rod with a flux mixture, however, would not be very effective. This device would not prevent dilatancy, but to the contrary would increase the probability of its occurrence. As discussed above, dilatancy occurs when a flux mixture is abruptly or suddenly subjected to pressure. By reducing the flow area for a particular fluid while maintaining the flow rate, the fluid is necessarily subjected to an increase in pressure. Therefore, the successive high-frequency variation of the annular flow space adjacent the extrusion nozzle would increase the pressure upon the flux mixture, and thereby increase the tendency for the mixture to dilate. While it is true that vibrating the flux mixture by imparting turbulent energy to the individual particles will effectively prevent dilation, the energy must be imparted to the particles without substantially increasing the pressure upon the mixture, above that provided by the extrusion cylinder. The Lerch method and apparatus do not accomplish this, and their use, therefore, would be adverse to the extrusion coating of a flux mixture upon weld wire or rod.

Similarly, Russian Pat. No. 143,071 discloses for a device for the extrusion coating of wire with rubber or plastic insulating material. The wire is fed through an electromagnetic coil which imparts reciprocal movement to an adjacent mandrel which guides the wire to the extrusion nozzle. The oscillating mandrel redistributes the pressure on the plastic material prior to its extrusion to ensure uniform coating. Since the means for vibrating the plastic is the mandrel which supports the wire, it necessarily follows that the wire to be coated is also subjected to vibrational movement. A liquefied plastic or rubber is a viscous fluid, and is sufficiently flexible to permit coating of a vibrating wire. However, it does not follow that such a device effectively and uniformly extrudes and coats a welding flux material of suspended solid particles on wire. Unlike a viscous fluid, the vibrating welding flux material will not adhere readily to a vibrating wire or rod. The particles will tend to break loose, thereby resulting in a discontinuous or nonuniform flux coating. Therefore, the device disclosed in the Russian patent would be ineffective for the extrusion coating of welding flux.

The apparatus disclosed and claimed in copending application Ser. No. 656,969, now U.S. Pat. No. (divided out of Ser. No. 552,655) provides for the effective and uniform extrusion coating of a welding flux composition composed of a mixture of liquid and solid flux materials, by substantially eliminating the tendency for the mixture to dilate during extrusion and thereby preventing increases in extrusion pressure. The extrusion apparatus comprises an extrusion nozzle, a flow guide with a conical passage in the center thereof adjacent to the nozzle, but spaced therefrom for guiding welding flux composition therethrough to the extrusion nozzle, and a wire guide disposed within the center of the conical passage of the flow guide at a position spaced from the walls of said passage for feeding welding rod or wire through the center of the conical passage and the nozzle. A piston and cylinder in close juxtaposition to the flow guide, but spaced therefrom, provide the pressure for feeding the welding flux composition into and through the space between the welding rod or wire and the walls of the flow guide passage, to surround and enclose the rod or wire fed therethrough in a sheath of welding flux composition. A horn having a vibrator element attached thereto is connected to the apparatus for applying directly to the flow guide sonic and/or ultrasonic wave vibration at a frequency within the range from about 5,000 to about 400,000 c.p.s. The spaced position of the flow guide relative to the nozzle, the wire guide and the welding flux composition pressure feeding means shield them from such vibrations. The vibrating flow guide communicates the vibrations to the welding flux composition passing therethrough so as to maintain the welding flux composition uniform and inhibit its separation into liquid and solid components during extrusion, while maintaining a uniform extrusion of such composition at a uniform extrusion pressure. The vibration of the particles of welding flux imparted thereto by the flow guide decreases the internal friction between the particles, maintains the uniformity of the mixture, and thereby prevents dilatancy and squeezing out of the flux mixture during the extrusion operation, and eccentricity of the flux coating upon the welding electrode.

In accordance with the present invention, a method is provided (carrying forward the elected invention of Ser. No. 552,665) for the uniform extrusion coating of welding wire or rod with a welding flux composition, in which high-frequency vibration is utilized to prevent dilatancy, squeezing out and solidification of the flux mixture when subjected to extrusion pressures.

Further, in accordance with this invention, another embodiment of extrusion coating apparatus is provided that represents an improvement on the apparatus claimed in Ser. No. 656,969. The apparatus of the present invention provides an efficient means by which high-frequency vibration is imparted to the particles of welding flux, to further inhibit the tendency of the welding flux mixture to dilate and solidify within the extrusion cylinder, thus ensuring a uniform concentric coating of flux upon the welding electrode.

The extrusion coating method of this invention comprises, in combination, the steps of feeding welding rod or wire through the center of an extrusion nozzle at a position spaced from the walls of the nozzle; pressure forcing welding flux composition into and through the space between the welding rod or wire and the walls of the nozzle, to surround and enclose the rod or wire fed therethrough in a sheath of welding flux composition; and applying vibration to the welding flux composition prior to its passage through the extrusion nozzle, to decrease the internal friction between the particles of welding flux by imparting turbulent energy thereto, and to inhibit its separation into liquid and solid components due to dilatancy by maintaining a uniform dispersion thereof, thus uniformly extruding such composition at a uniform extrusion pressure.

Low-frequency mechanical or commercially available electrical vibrators give unsatisfactory results, since the pulses of energy applied to the flux particles are intermittent. Therefore, as previously disclosed, sonic and/or ultrasonic vibrating means having a frequency range of approximately 5,000 to 400,000 c.p.s. are employed for imparting vibration to the flux mixture. The higher the frequency of the vibration within the range given, the better are the results obtained. Therefore, means for generating ultrasonic vibration with a frequency above 10,000 c.p.s. up to approximately 400,000 c.p.s. is preferred. Such vibration can be converted to mechanical vibration at or near the nozzle member of the extrusion coating machine.

In the embodiments shown in copending U.S. Pat. application Ser. No. 656,969, now U.S. Pat. No. 3,456,295, a sonic and/or ultrasonic vibrator element is used in combination with a horn. The horn can be mounted at or near the nozzle member, with appropriate fastening means, so that vibration can be imparted in a direction which is parallel with, or perpendicular to the direction of flux flow. The sonic and/or ultrasonic vibration can be applied as mechanical vibration of the extrusion nozzle, or the flow guide member adjacent to the extrusion nozzle, and is transmitted thereby to the flux particles themselves, causing their mechanical vibration. The vibrational energy can also be transmitted directly from the horn to the flux particles in a direction which is oblique to the direction of particle flow prior to their compression by the nozzle. In this manner, a greater amount of vibrational energy will be absorbed by the particles. The resistance to coating will thus be decreased, and in cooperation with the proper extrusion pressure, a smooth coating upon the welding rod or wire can be obtained. Whether the vibration is imparted first to a mechanical member or directly to the flux mixture, it is, of course, possible and desirable to provide a plurality of vibrators to increase the efficiency of the method. These can be mounted in opposed or adjacent positions to each other.

The improved uniform extrusion coating apparatus of the present invention features another embodiment of means for imparting vibrational energy directly to the welding flux particles. The extrusion apparatus comprising, in combination, an extrusion nozzle having a tapered entrance passage for guiding the welding flux composition into the nozzle; means disposed within the entrance passage for guiding welding rod or wire through the center of the extrusion nozzle, at a position spaced from the tapered walls of said entrance passage; means disposed in close juxtaposition to the entrance passage of the nozzle for pressure-forcing the welding flux composition into and through the space between the welding rod or wire and the tapered walls of the entrance passage, to surround and enclose the welding rod or wire in a sheath of welding flux composition; and means connected to the extrusion nozzle for imparting directly to the particles of welding flux, prior to the extrusion thereof, sonic and/or ultrasonic vibration at a frequency within the range from about 5,000 to about 400,000 c.p.s. to maintain a uniform dispersion of particles within the welding flux composition, inhibit its separation into liquid and solid components and decrease the internal friction between flux particles during extrusion while uniformly extruding such composition at a uniform extrusion pressure.

Preferably, the vibrating means employed in the extrusion apparatus comprises a sonic and/or ultrasonic vibrator element and a horn connected thereto to transmit the high-frequency vibrational waves directly to the flux mixture in the tapered entrance passage of the extrusion nozzle. The vibration horns can be mounted on and within the body of the extrusion nozzle so that the ends of the horns enter the tapered entrance passage of the nozzle at a position which is oblique to the direction of flow. Although a horn mounted in either a parallel or a perpendicular position relative to the direction of flow will also impart sufficient turbulent energy to the flux particles to ensure proper extrusion coating, it has been found that obliquely mounting the horn yields the highest quality welding electrode, and vibration can be most efficiently applied. The utilization of more than one vibration horn will ensure that the vibrational energy imparted to the welding flux particles will be uniformly distributed within the mixture and not concentrated in one area.

The vibration horns are shielded from the body of the extrusion nozzle to prevent the vibration of the entire apparatus. Applying the sonic and/or ultrasonic vibrational waves directly to the welding flux mixture in this manner ensures that only the flux particles will be vibrated, and further ensures that the extent of vibrational energy imparted to the particles relative to the amount of vibrational energy generated will be greater than heretofore provided. Therefore, the operation of the extrusion apparatus is extremely efficient, and the flux coating of the electrode produced therefrom is completely uniform and concentric.

The invention will be further described with reference to the accompanying drawings in which.

Figure 1:
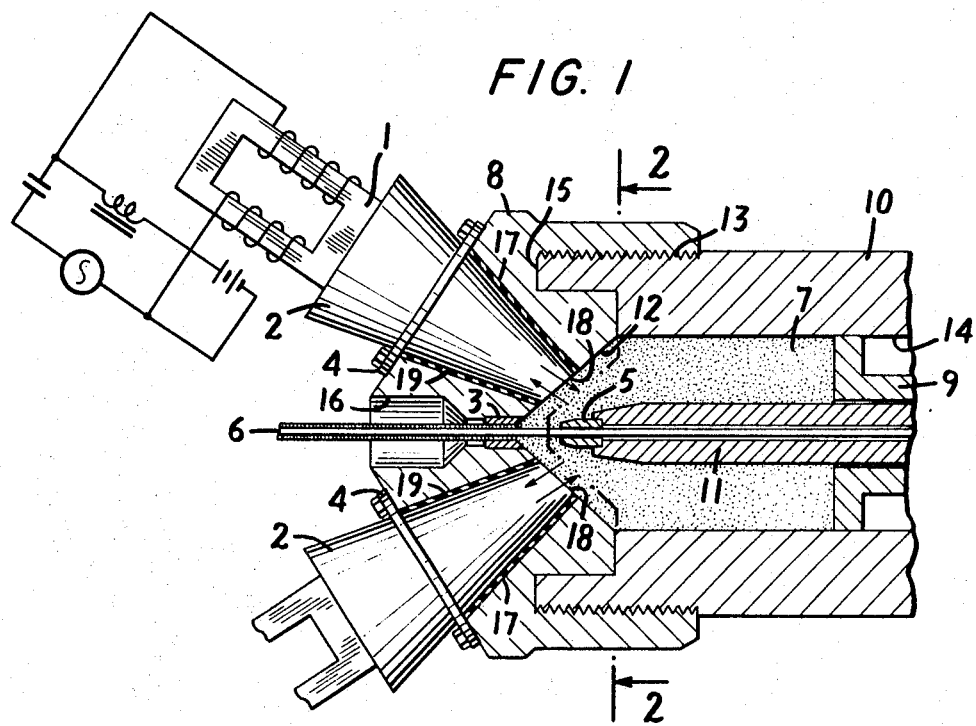
FIG. 1 is a longitudinal cross-sectional view of an apparatus for the uniform extrusion coating of welding flux composition in accordance with the present invention.
Figure 2:
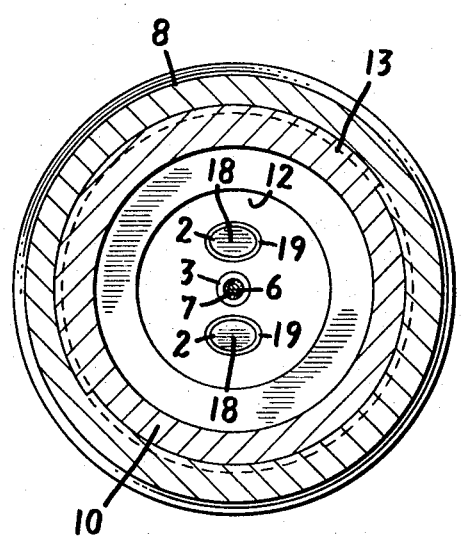
FIG. 2 is a cross-sectional view of the extrusion apparatus taken along the lines 2—2 of FIG. 1 and looking in the direction of the arrows.

The extrusion coating apparatus shown in FIG. 1 and FIG. 2 comprises a pressure cylinder 10 and a conical extrusion head 8 which threadably engages one end 13 of the cylinder 10, the reentrant portion 15 enclosing the end 13 in a pressuretight connection. A piston 9 is disposed within the central bore 14 of the cylinder 10 to provide a positive pressure for feeding and extruding the flux mixture 7, confined within the cylinder bore 14. The extrusion head 8 is provided with a central bore 16 in which is fitted an extrusion nozzle 3 disposed in the center thereof, and an interior wall 12 which extends from cylinder 10 to the central bore 16 and defines a passage which guides the flow of flux material from the cylinder 10 to the nozzle 3. The diameter of the nozzle is approximately the diameter of the coated rod or wire, and is larger than the rod or wire by a distance approximately the depth of the flux coating thereon.

A welding wire or rod support member 11 is disposed within the bore 14 of the cylinder 10 and a wire guide 5 is attached to the end of the support 11, so disposed within the tapered passage as to guide the welding rod or wire 6 directly to the center of the extrusion nozzle 3 as it is fed through the extrusion apparatus. Thus, the rod or wire can acquire a uniform concentric coating of flux material thereon as it passes through the nozzle. The support 11 also provides additional guidance for the movement of piston 9 within cylinder 10, thereby preventing it from binding or jamming within the extruding apparatus.

The flux mixture 7 fills the annular space between the support 11 and the inside walls of the bore 14. On the pressure stroke of the piston 9, the flux material 7 is forced from the cylinder 10 into the tapered passage, and subsequently through the nozzle 3, thereby being extruded as a cylindrical coating upon the weld rod or wire 6 as shown in FIG. 2.

The vibrating means for imparting turbulent energy directly to the particles of flux material to maintain a uniform dispersion thereof and to prevent dilatancy comprises a plurality of horns 2 each connected to a corresponding ultrasonic vibrator element 1. The horns 2 extend through tapered bores 17 in the head 8 to the interior wall 12, with their interior ends 18 mounted flush against the wall 12. The positioning of the interior ends 18 is ensured by a flange 4 on the horns 2, which is bolted in place to the exterior of extrusion head 8. Each horn 2 is mounted obliquely to the direction of flow of the flux material, and their interior ends 18 are in direct contact with the flux mixture 7. The horns 2 fit snugly within the bores 17 in head 8, so that flux material under pressure cannot pass therebetween, yet they are shielded therefrom by means of a rubber sleeve 19 to inhibit vibration of the head. The flange 4 is positioned at the node of the longitudinal vibration. Therefore, the horn vibrates freely, so that the amplitude of the portion which is in direct contact with the flux can be boosted to several times that of the vibrator element 1. In this manner, a relatively small amount of energy is needed in order for the vibrator to impart sufficient vibrational energy to the particles of flux material to prevent dilatancy of the mixture upon its extrusion through the nozzle 3. By imparting the ultrasonic vibrations from the horn 2 directly to the particles of flux, an extremely efficient and high speed extrusion operation can be maintained.

To carry out the method of the instant invention, a mass of flux mixture 7 is deposited into the cylinder 10 and subjected to pressure by movement of the piston 9 thereagainst. Simultaneously, sonic and/or ultrasonic waves are transmitted from the vibrator 1 through the horn 2, to the flux mixture 7 located within the tapered passage 12. The electrode rod or wire 6 is then passed through guide 5. As the electrode is passed through the nozzle 3, the flux mixture, which has been vibrated by the horn 2, will be coated uniformly thereon. Thus, the flux mixture is coated with decreased pressure and the coated product exhibits an improved smooth coating. By use of the instant method and apparatus, production can be increased from 60 to 95 percent above that of the conventional methods used in the prior art.

The following examples are set forth to illustrate the advantages obtained by the utilization of the apparatus for the uniform extrusion coating of welding flux materials, shown in FIGS. 1 and 2.

EXAMPLE 1

The materials and conditions employed were as follows:

| | |
|---|---|
| Flux | lime-type flux for welding rod |
| Binder | sodium silicate |
| Core | 4 mm. diameter by 400 mm. length |
| Nozzle | 6.3 mm. (inside diameter) |
| Production rate of the coated wire | 400 meters per minute |

Figure 3:
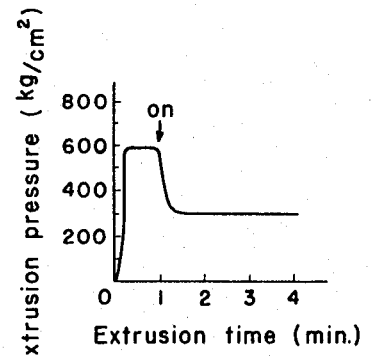
FIG. 3 is a graph representing the extrusion pressure and extrusion time required for coating a welding electrode with flux, with and without the application of vibration to the flux.

As shown in FIG. 3, the coating operation was carried out without applying sonic wave vibration to the flux mixture for the first one minute of operation. At the point indicated by "on," the sonic wave vibration was applied and the coating operation was continued until complete. The change in the required extrusion pressures after the application of the sonic vibration to the welding flux mixture is clearly shown on the graph. The extrusion pressure was 600 kg./cm.$^2$ prior to introduction of the sonic wave vibration, whereas the extrusion pressure decreased to 300 kg./cm.$^2$ shortly after the vibration commenced. The decrease in extrusion pressure was due to the action of the sonic wave vibration upon the particles of welding flux, whereby uniformity of the flux mixture was maintained and the internal friction between particles decreased.

EXAMPLE 2

Figure 4:
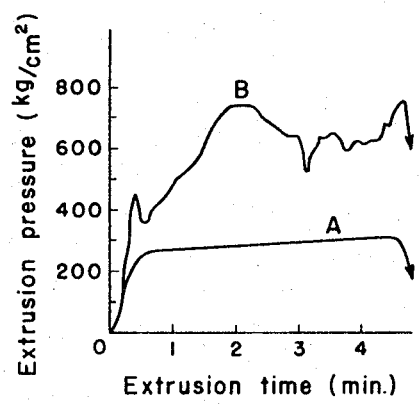
FIG. 4 is a graph comparing the required extrusion pressure for flux coating of welding electrodes with and without vibrational waves applied to the flux mixture.

This example is set forth to show the effect of the sonic wave vibration upon a welding flux material that is poor in fluidity and in which dilatancy and the resulting squeeze-out phenomenon are very likely to occur. All other conditions employed are the same as those of example 1. As shown in curve B of FIG. 4, without vibration the extruding pressure gradually increases with the lapse of time, due to dilatancy and the squeezing out of liquid rich flux from the center of the extrusion apparatus. The pressure as illustrated by curve B was unstable and the coated surface of the welding rod thus attained was found to be scratchy and nonuniform. When the sonic wave vibration was applied to the welding flux mixture contained within the extrusion apparatus, the extrusion pressure was low and stable until the coating operation was completed, as illustrated by curve A. Moreover, the coated surface of the welding rod thus attained was found to be extremely uniform and with few, if any, scratches.

Having regard to the foregoing disclosure, the following is claimed as the inventive and patentable embodiments thereof.

1. A method for the substantially uniform extrusion coating through an extrusion nozzle of normally solid welding flux compositions composed of a mixture of liquid and solid flux material, and having a tendency to undergo dilatancy with a resulting increase in extrusion pressure during extrusion, comprising the steps of feeding welding rod or wire through an extrusion nozzle at a position spaced from the walls of the nozzle; forcing welding flux composition under pressure into and through the space between the welding rod or wire and the walls of the nozzle, to surround and enclose the rod or wire fed therethrough in a sheath of welding flux composition; and applying sonic or ultrasonic vibration to the welding flux composition but not to the extrusion nozzle or to the rod or wire, directing the vibration to the portion of the flux composition in proximity to and before it enters the extrusion nozzle, while extruding the composition through the extrusion nozzle, to decrease the internal friction between the particles of welding flux by imparting turbulent energy thereto, and to inhibit its separation into liquid and solid components by maintaining a uniform dispersion thereof, thus substantially uniformly extruding such composition and substantially uniformly coating the rod or wire therewith.

2. A method according to claim 1 in which sonic vibration having a frequency range of approximately 5,000 to 400,000 c.p.s. is applied to the welding flux composition.

3. A method according to claim 1 in which ultrasonic vibration having a frequency range of approximately 10,000 to 400,000 c.p.s. is applied to the welding flux composition.

4. A method according to claim 1 in which the vibration is applied to a flow guide member adjacent to the extrusion nozzle which in turn imparts the vibration to the particles of flux composition.

5. A method according to claim 1 in which the vibration is imparted directly to the welding composition by the means creating the sonic or ultrasonic vibrations to ensure that vibrational energy is imparted to all flux particles.

6. A method according to claim 4 in which the vibration is imparted to the flow guide member in a direction which is parallel with the direction of flux flow.

7. A method according to claim 4 in which the vibration is imparted to the flow guide in a direction which is perpendicular to the direction of flux flow.

8. A method according to claim 1 in which the vibration is imparted directly to the welding flux composition in a direction which is oblique with respect to the direction of flux flow.

* * * * *